Oct. 12, 1965  D. C. STONE, JR  3,211,230
MULTIPLE ZONE SELECTIVE CROSS-OVER APPARATUS
Filed Feb. 18, 1963  5 Sheets-Sheet 2

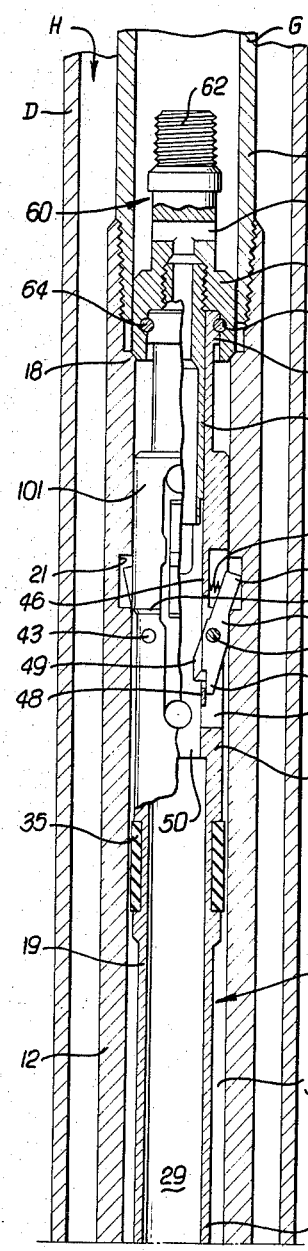
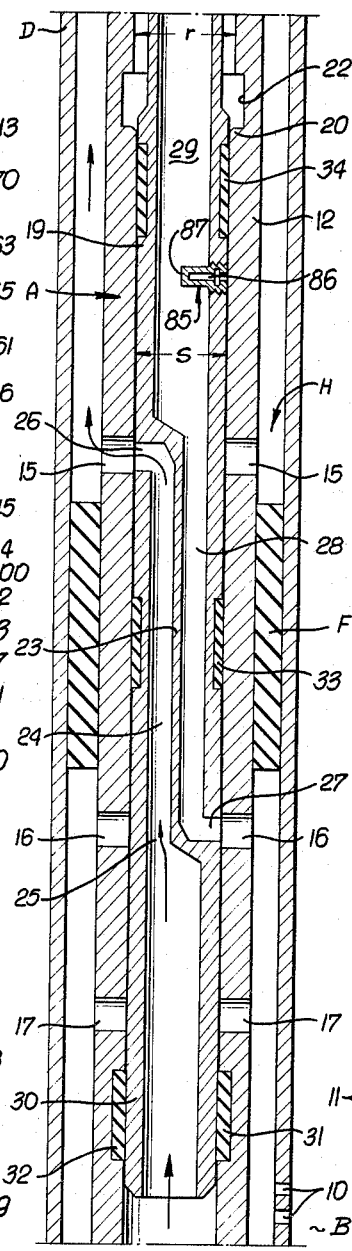
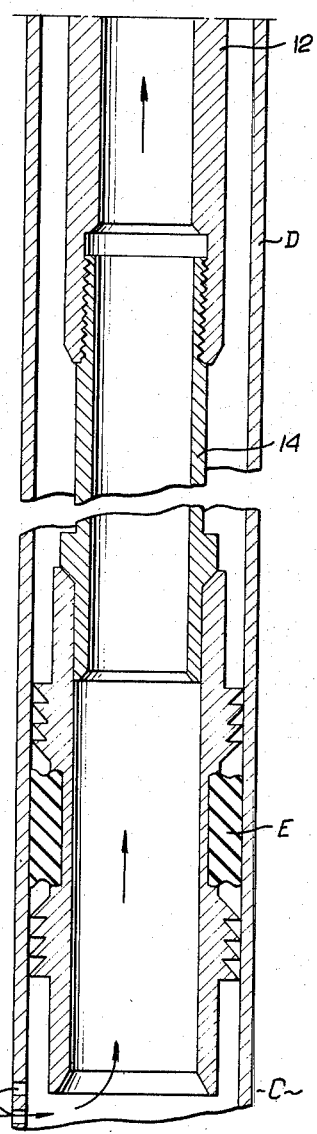

INVENTOR.
DEWEY C. STONE, JR.
BY
Mellin and Hanscom
ATTORNEYS.

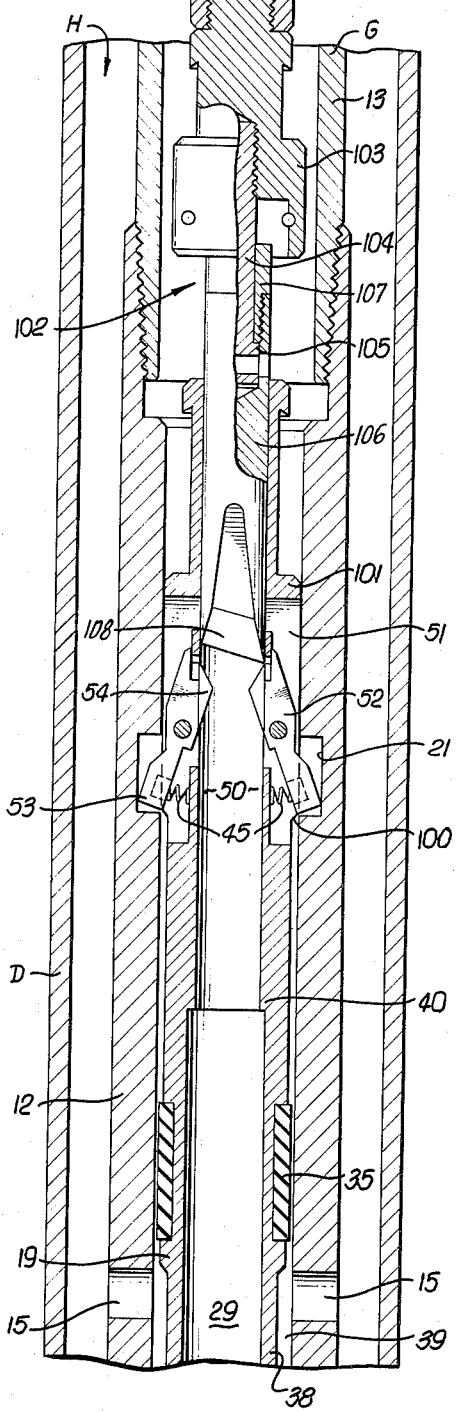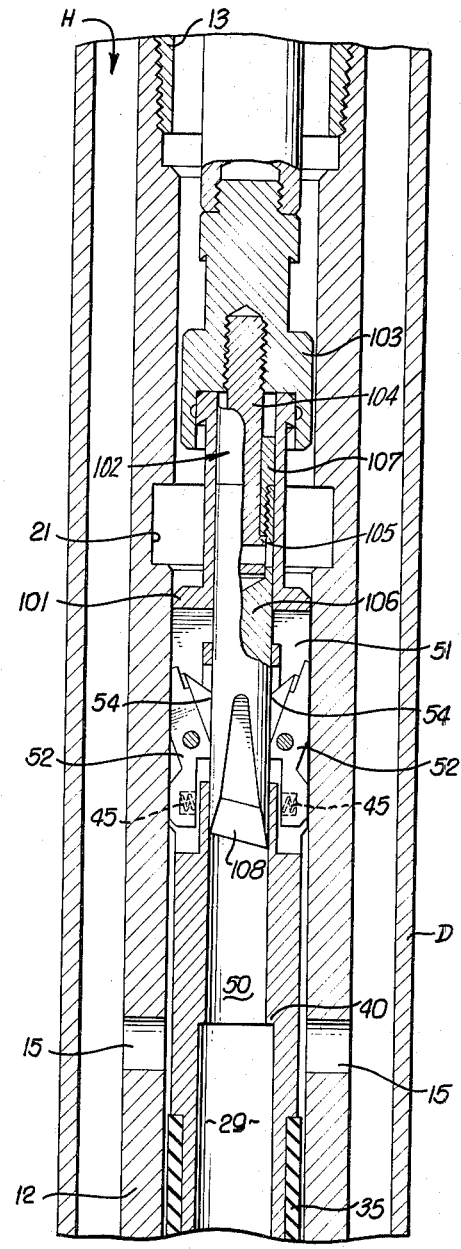

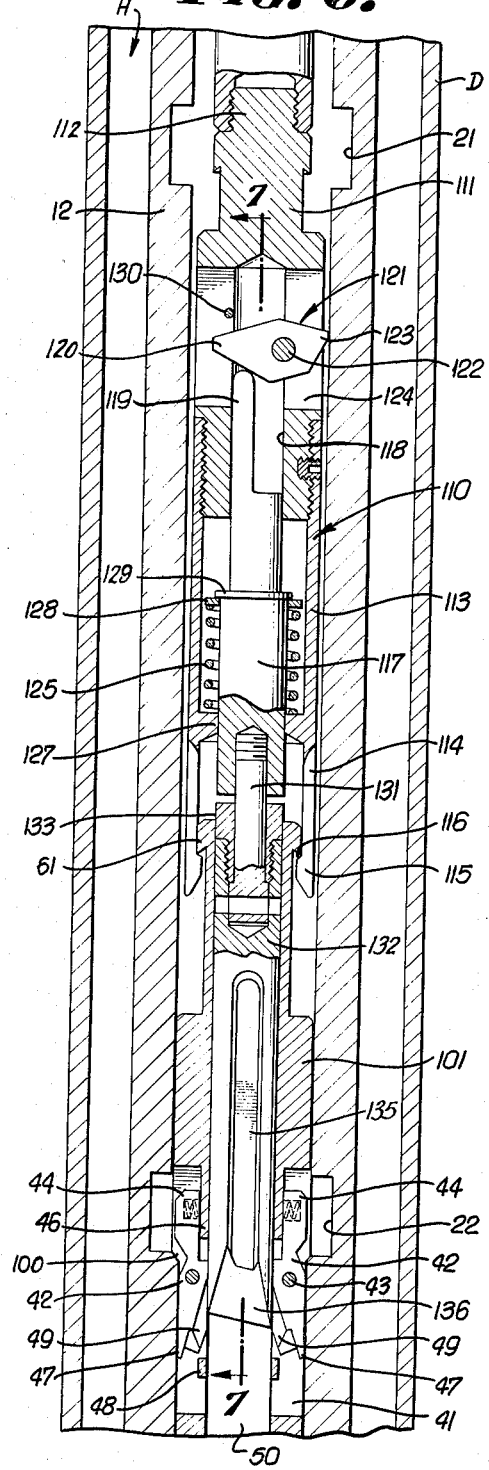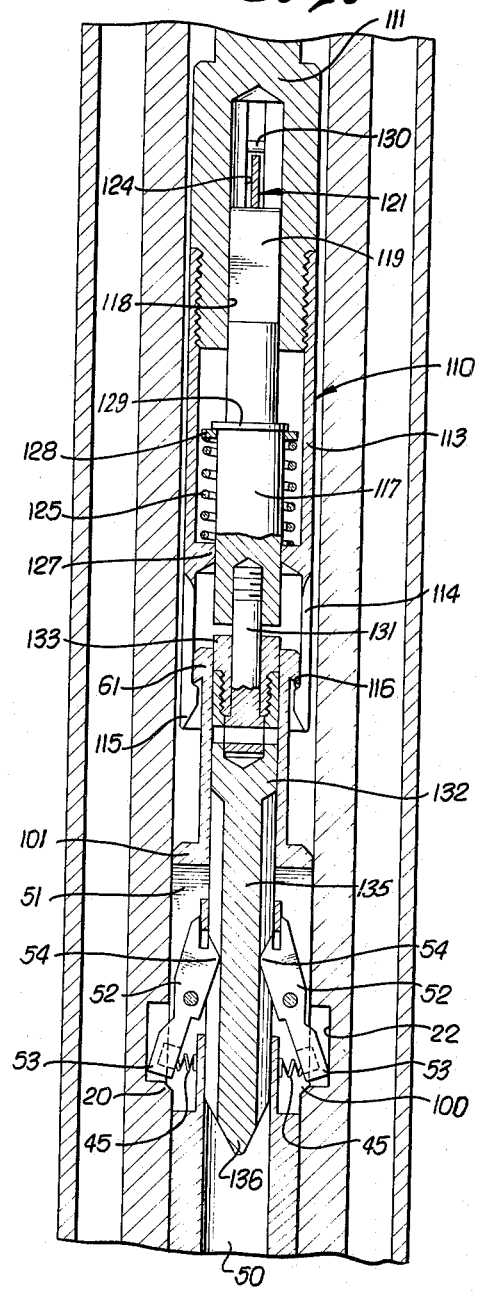
INVENTOR.
DEWEY C. STONE, JR.
BY
Mellin and Hanscom
ATTORNEYS.

Oct. 12, 1965  D. C. STONE, JR  3,211,230
MULTIPLE ZONE SELECTIVE CROSS-OVER APPARATUS
Filed Feb. 18, 1963  5 Sheets-Sheet 5

INVENTOR.
DEWEY C. STONE, JR.
BY
Mellin and Hanscom
ATTORNEYS.

United States Patent Office 3,211,230
Patented Oct. 12, 1965

3,211,230
MULTIPLE ZONE SELECTIVE CROSS-OVER
APPARATUS
Dewey C. Stone, Jr., Dallas, Tex., assignor to Baker Oil
Tools, Inc., Los Angeles, Calif., a corporation of
California
Filed Feb. 18, 1963, Ser. No. 259,223
18 Claims. (Cl. 166—145)

The present invention relates to subsurface well bore apparatus, and more particularly to apparatus for controlling the paths of fluid flow between a plurality of formation zones in a well bore and the top of the latter.

It is desirable to conduct production from each of a plurality of producing zones in a well bore separately to the surface. Usually, packer apparatus is set in the well bore to isolate the producing zones from one another. Production from the first zone may be conducted through a tubing string to the top of the well bore, production from a second zone being conducted through a region externally of the tubing string, such as the annulus around the tubing string, to the top of the well bore. At times, the flow pattern may require change, production from the second zone being caused to flow through the tubing string to the top of the well bore, and production from the first zone through the annulus around the tubing string, or other region externally of the tubing string, to the top of the well bore.

An object of the invention is to provide apparatus for conducting fluids from different well formations separately to the top of the well bore, the flow path of one formation fluid being through a tubing string extending to the top of the well bore, and the flow path of another formation fluid being externally of the tubing string, such flow paths being selectively interchangeable by shifting the location of a flow control device with respect to the tubing string and without withdrawing the flow control device from the well bore.

Another object of the invention is to provide apparatus for producing fluids in a conventional manner from a lower zone in a well bore through tubing extending to the top of the well bore, and from an upper zone through the annulus around the tubing string, or for producing fluids in a crossed-over manner from the lower zone through the annulus and from the upper zone through the tubing, a flow control portion of the apparatus being shiftable between upper and lower positions in the tubing string to selectively change the mode of production between conventional and crossed-over.

A further object of the invention is to provide apparatus for producing fluids in a conventional manner from a lower zone in a well bore through tubing extending to the top of the well bore and from an upper zone through the annulus around the tubing string, or for producing fluids in a crossed-over manner from the lower zone through the annulus and from the upper zone through the tubing, a flow control portion of the apparatus being shiftable bodily in the tubing string from an upper to a lower position, and vice versa, to selectively change the mode of production between conventional and crossed-over, and in which the flow control portion can be releasably secured in such upper and lower positions.

An additional object of the invention is to provide apparatus for producing fluids in a conventional manner from the lower zone in a well bore through tubing extending to the top of the well bore and from an upper zone through the annulus around the tubing string, or for producing fluids in a crossed-over manner from the lower zone through the annulus and from the upper zone through the tubing, a flow control portion of the apparatus being adapted to be lowered through the tubing string initially to an upper position or a lower position therein, to either produce the fluids in the conventional or crossed-over manner, and in which the flow control portion can thereafter be shifted as often as desired between its upper and lower positions without withdrawing it from the tubing string.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

FIGURES 1a, 1b and 1c together constitute a longitudinal section through apparatus disposed in a well bore for conducting production from a plurality of zones through separate paths to the top of the well bore, the apparatus being conditioned for conducting fluid in a crossed-over manner, FIGS. 1b and 1c being lower continuations of FIGS. 1a and 1b, respectively;

FIGS. 2a and 2b are views corresponding to FIGS. 1a and 1b, the apparatus being positioned for producing fluids from a plurality of zones in a conventional manner, FIG. 2b being the lower continuation of FIG. 2a;

FIG. 3 is an enlarged cross-section taken along the line 3—3 on FIG. 2a;

FIG. 4 is a view similar to FIG. 1a illustrating the apparatus being released from its upper position for downward movement to the lower position disclosed in FIGS. 2a and 2b;

FIG. 5 is a view similar to FIG. 4 disclosing the apparatus in released condition and partly shifted downwardly from the position shown in FIG. 4;

FIG. 6 is a view corresponding to FIG. 2a showing the apparatus being released from its lower position, enabling its elevation in the tubing string;

FIG. 7 is a longitudinal section taken along the line 7—7 on FIG. 6;

Figure 11:
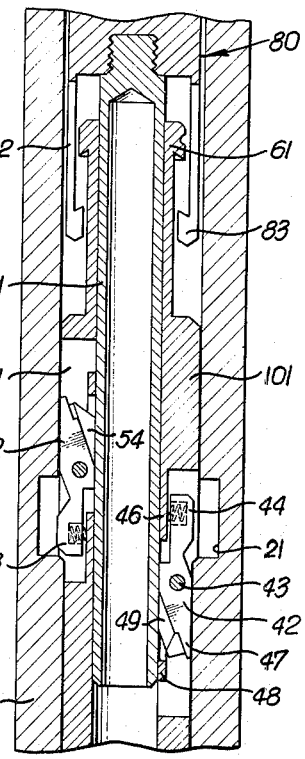
Figure 9:
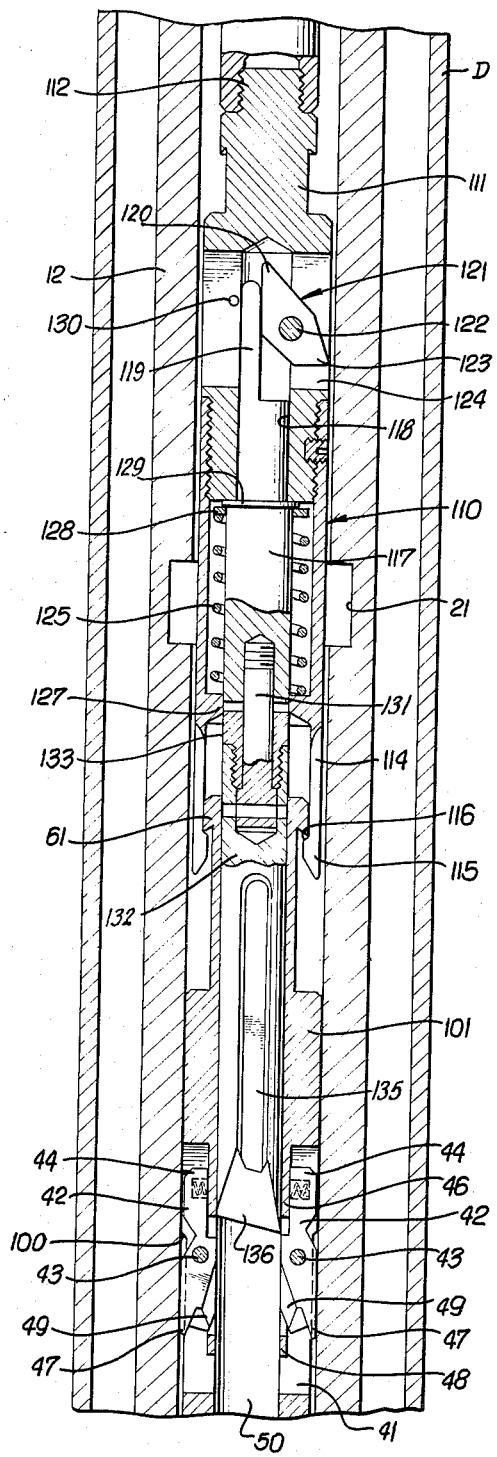
FIG. 9 is a view similar to FIG. 6, parts of the apparatus being in still another relative position.
Figure 10:
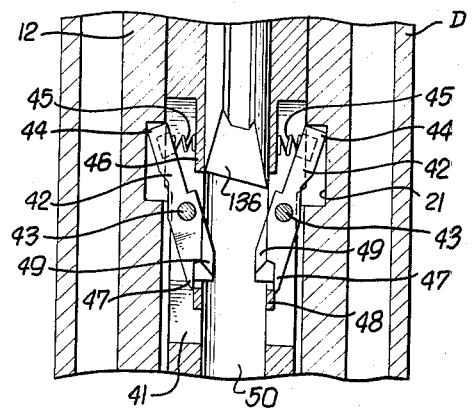

FIG. 10 is a longitudinal section of the upper portion of the apparatus shifted to still another position in the tubing string; and FIG. 11 is a longitudinal section through a portion of the apparatus illustrating release of the latch or locking device to permit removal of the flow control portion of the apparatus from the tubing string, the upwardly and downwardly holding latches being disclosed in the same plane, instead of 90° to one another, for convenience of illustration.

The apparatus A specifically illustrated in the drawings is intended to conduct fluid from upper and lower formation zones B, C through separate paths to the top of the well bore. A string of casing D is suitably mounted in the well bore, the casing ordinarily having cement deposited therearound between the upper and lower zones B, C to prevent communication therebetween. A lower packer E of any suitable type is anchored in packed-off condition in the well casing between upper and lower perforations 10, 11 in the casing opposite the upper and lower zones, respectively, and an upper well packer F of any suitable type may be disposed in the well casing above the upper perforations 10. This upper well packer F may be permanently anchored in the well casing D, or may be of the retrievable type, as desired. A tubular string G is disposed in the casing, extending from the top thereof. This tubing string is related in any suitable manner with the upper packer F in leak-proof relation with respect thereto, and extends downwardly therefrom and is suitably related to the lower packer E in leak-proof relation with respect thereto. The tubular string may include an outer body 12 which may, if desired, actually constitute the body portion of the upper packer F, the upper portion of this outer body being threadedly or otherwise suitably connected to a tubing string section 13 thereabove. The lower portion of the body may be threadedly connected to a section 14 of the tubing string extending therebelow, the latter being associated in leak-proof relation with the lower packer E.

It is desired to variously conduct the fluids from the upper and lower zones B, C to the top of the well bore. Such fluid may be conducted in a conventional manner by causing the lower formation fluid to pass through the lower perforations 11 into the casing D and upwardly through the lower packer E into the tubing string G, flowing upwardly through the tubing string to the top of the well bore. The production from the upper formation zone B may pass through the upper perforations 10 into the casing string D to be conducted through a path externally of the tubing string G to the top of the well bore, as through the tubing-casing annulus H around the tubing string. If desired, however, the production from the lower zone C can be crossed over into the tubing-casing annulus H to be conducted to the top of the well bore, the production from the upper formation zone B being conducted through the tubing string G to the top of the well bore.

A single mechanism K is disposed within the tubing G and can be located in different positions therein to conduct fluid from the upper and lower formation zones B, C to the top of the well bore in the conventional manner or in the crossed-over manner. As shown, the outer tubular body 12 has a plurality of outlet ports 15 above the upper packer F and a plurality of inlet ports 16 below the upper packer. The body 12 also has a set of equalizing ports 17 below the upper packer F. The outer body 12 also has an upper stop shoulder 18 to locate an inner tubular body or mandrel 19 in a predetermined position with respect to the ports 15, 16, 17, and it also has a lower stop shoulder 20 to locate the mandrel 19 in another predetermined position with respect to such ports. The inside diameter $r$ of the outer body 12 above the lower stop shoulder 20 is greater than the inside diameter $s$ of the body below such stop shoulder. Moreover, the tubing section 14 below the outer body 12 has a greater internal diameter than the internal diameter of the passage through the body 12 thereabove.

The outer body 12 also has an upper internal locking groove 21 in its enlarged internal diameter portion and a lower internal locking groove 22 above its smaller diameter portion. Such locking grooves, as explained hereinbelow, will lock the tubular mandrel 19 in two different longitudinal positions within the outer body 12, in order to determine the paths of fluid flow from the lower and upper formation zones C, B.

The tubular mandrel 19 has a longitudinal partition 23 extending therewithin to separate the mandrel into a longitudinal crossover passage 24 having a lower inlet 25 and an upper outlet or port 26 communicating with the exterior of the mandrel. The partition also provides a lower inlet port 27 and a passage 28 communicating with the central tubular passage 29 through the mandrel 19 that communicates with the tubing string G thereabove. The mandrel can be placed in the crossed-over position illustrated in FIGS. 1a and 1b, in which the mandrel outlet port 26 communicates with the outlet port 15 of the outer body 12, and in which the mandrel inlet port 27 communicates with the inlet port 16 of the tubular body below the upper packer F. When the mandrel is in this position, its lower end 30 slidably seals with a suitable inner side seal 31 mounted in an internal groove 32 in the outer body below the equalizing ports 17, a suitable side seal 33 mounted on the mandrel then having sealing engagement with the inner wall of the outer body 12 between the body inlet and outlet ports 16, 15, another side seal 34 on the mandrel sealingly engaging the wall of the outer body 12 above the outlet port 15, and, as shown in FIG. 1b, below the lower lock groove 22. An uppermost seal 35 is also mounted on the mandrel, this seal being adapted to seal against the wall of the lower outer body passage $s$ of lesser diameter below the lower stop shoulder 20.

With the ports and seals located as illustrated in FIGS. 1a and 1b, production from the lower zone C will pass upwardly through the lower packer E and the tubing G into the lower end of the outer body 12, flowing upwardly through the lower central inlet 25 of the mandrel 19, through its crossover passage 24 and out through its port 26, such fluid continuing to flow out through the outlet port 15 above the upper packer F for continued upward travel through the tubing-casing annulus H to the top of the well bore and casing. Production from the upper zone B will pass through the upper perforations 10 and upwardly around the exterior of the outer body 12 below the upper packer F, flowing through the body inlet ports 16 into the inlet port 27 of the mandrel for continued upward movement through the mandrel passage 28, 29 into the tubing string G, to be conducted by the latter to the top of the well bore and casing. Fluids from the upper and lower formation zones B, C cannot comingle because of the second and third seals 34, 33 sealing against the wall of the outer body 12 on opposite sides of the outlet ports 15 and because of the sealing of the lower portion of the mandrel against the lowermost body seal 31.

Figure 2A:
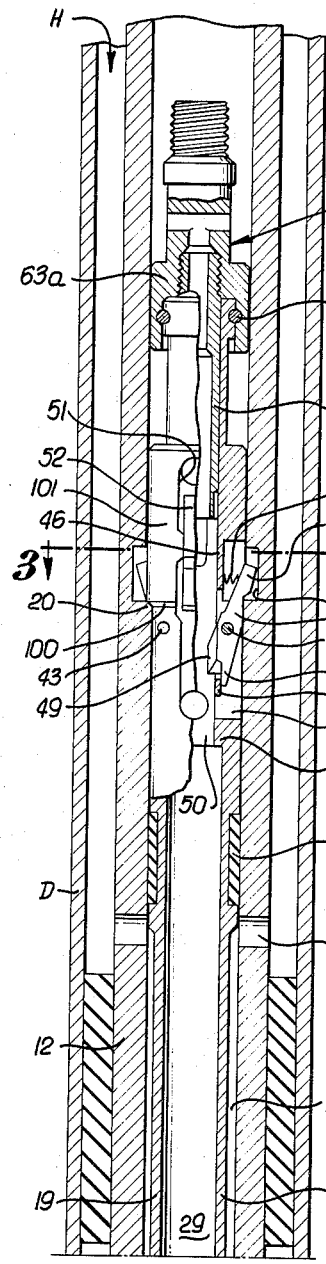
Figure 2B:
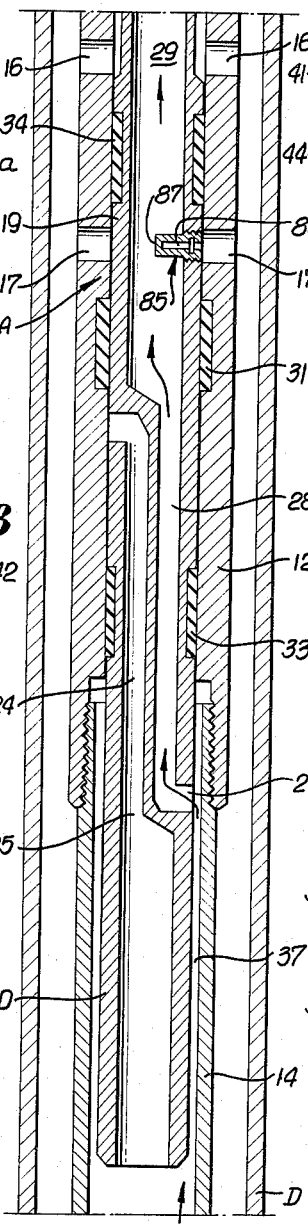
Figure 3:
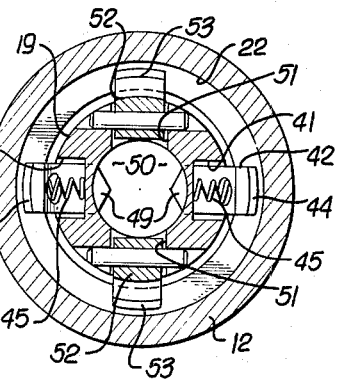

If production from the upper and lower zones B, C is to be conducted to the top of the well bore in a conventional manner, the mandrel 19 is lowered and disposed in the position illustrated in FIGS. 2a and 2b. When in such position, the inlet port 27 of the mandrel has been shifted downwardly and disposed within the enlarged internal diameter tubing 14 below the outer body 12, the inlet port of the mandrel communicating with the annular passage 37 between the lower portion of the mandrel 19 and the tubing 14, so that fluid from the lower zone C can flow upwardly through the lower packer E and the tubing G, and through the annular passage 37 into the mandrel passage 28 for continued upward flow through the tubing string G to the top of the well bore. When the mandrel occupies the lower position shown in FIGS. 2a and 2b, the uppermost seal 35 is disposed within the smaller internal diameter portion $s$ of the outer body 12 below the shoulder 20, sealing against the wall of the body above the outlet ports 15, the second seal 34 being disposed below the body inlet ports 16, the internal body seal 31 engaging the periphery of the mandrel 19 above the outlet port 26 of the crossover passage 24 so that the upper end of such passage has no communication with the tubing-casing annulus H, or with the upper well formation production at all. The fluid from the upper zone B will now pass through the body inlet ports 16 into a passage 38 between the first and second seals 35, 34 and between a reduced diameter portion 39 of the mandrel 19 and the inner wall of the outer body 12, such fluid flowing upwardly through such annular passage 38 and out through the body outlet ports 15 into the tubing-casing annulus H to be conducted therethrough to the top of the well bore and casing (FIGS. 2a, 2b).

The mandrel 19 can be positively located in the tubing string G and in the outer body member 12 of the latter in either the position illustrated in FIGS. 1a and 1b, which is the crossover position, or in the conventional position illustrated in FIGS. 2a and 2b. It can also be releasably locked in these two positions. The mandrel can be locked in the position illustrated in FIGS. 1a and 1b or in FIGS. 2a and 2b by a lock or latch device mounted on the upper portion 40 of the mandrel, which latch or lock device is adapted to shift into either the upper locking groove 21 or the lower locking groove 22. As shown, the mandrel portion 40 has a pair of opposed elongate slots 41 in which upwardly holding latches or dogs 42 are disposed. Each of these latches is mounted on a pivot pin 43 extending across a slot 41 and suitably secured to the mandrel. The upper dog or lug portion 44 of each latch is urged outwardly and into a locking groove 21 or 22, when aligned therewith, by a helical compression spring 45 bearing thereagainst and also against an inner portion 46 of the mandrel or body portion 40. Outward shifting of the upper latch portion 44 is limited by engagement of a lower lock finger 47, on the opposite side of the pivot pin 43, with a body stop web 48 extending across the slot 41. When the upper dog or lug 44 is disposed outwardly in a lock groove, a retracting nose 49 on the lower portion of each latch 42 is adapted to extend inwardly of the central passage 50 through the mandrel 19.

A second pair of opposed elongate slots 51 is formed in the mandrel or body portion 40 angularly displaced from the other slots 41, receiving a second pair of latches 52 which are the same as the other pair of latches 42 except that they are reversely arranged, the locking or dog portion 53 being disposed on the lower portions of each latch 52 and the upper retracting nose 54 on the upper portion. Such second set of latches or dogs 52 is adapted to expand into a locking groove 21 or 22 and anchor the mandrel 19 against downward movement within the outer body 12.

When the upwardly and downwardly facing latches 42, 52 are disposed in the upper locking groove 21, the mandrel is in the position illustrated in FIGS. 1a and 1b, which is the crossover position. When the latches 42, 52 expand into the lower locking groove 22, the tubular mandrel 19 is in the position illustrated in FIGS. 2a and 2b, which is the conventional position for conducting production from the upper and lower producing formations B, C to the top of the well bore.

The location of the mandrel 19 with its latches 42, 52 disposed in the upper groove 21, or in the lower groove 22, can be determined in several ways. As shown in FIGS. 1a and 1b, the mandrel 19 can be lowered initially through the tubing string and definitely located so that its latches 42, 52 will enter the upper groove 21. On the other hand, the mandrel 19 can be initially lowered through the tubing string G, its downward movement being limited such that the latches 42, 52 enter the lower groove 22 and latch the mandrel in the position illustrated in FIGS. 2a and 2b. If the mandrel is initially located with its latches in the upper groove 21, it can be released therefrom and shifted downwardly to the lower position in which the latches 42, 52 are disposed in the lower groove 22, all without removing the mandrel 19 from the tubular string G. Similarly, assuming the mandrel to be located in the lower position with its latches 42, 52 disposed within the lower groove 22, such latches can be released from the lower groove and the mandrel elevated to locate the latches in the upper groove 21, all without withdrawing the mandrel 19 from the tubular string G.

A mechanism is illustrated in FIGS. 1a and 1b for initially locating the mandrel 19 in the upper position with its latches 42, 52 disposed in the upper internal groove 21. As shown, the mandrel 19 with its latches 42, 52 can be lowered from the top of the well bore through the tubing string G on a running-in tool 60 releasably connected to the upper portion 61 of the mandrel. The running-in tool may have an upper threaded pin 62, or the like, adapted for connection to a wire line device (not shown) connected to a wire line (not shown) extending to the top of the well bore. A portion of the running-in tool is constituted as a head 63 having an outside diameter less than the inside diameter of the tubular string G above the body 12 but greater than the inside diameter of the upper passage r through the outer body 12, so that the lower end of the head 63 will come into engagement with the upper stop shoulder 18. This head 63 is releasably secured to the upper retrieving head portion 61 of the mandrel by a pair of tangentially arranged shear screws 64 received within opposed recesses 65 in the running-in head 63 and the mandrel head 61. The running-in tool also includes a retracting tube 66 threadedly secured to the head 63 and receivable in the upper passage portion 50 of the mandrel and engageable with the nose portions 54 of the downwardly holding latches 52 to swing their lower ends or dogs 53 inwardly within the confines of the outer body 19, thereby preventing such downwardly holding latches from entering any coupling recesses, or the like, in the tubing string G.

The mandrel and running-in tool combination 19, 60 are lowered in the tubing G, the upwardly holding latches or dogs 42 merely ratcheting past the tubing couplings, shifting inwardly and outwardly against the force of the expanding springs 45. The retracting tube 66, as explained above, holds the downwardly holding latches 52 in their retracted position. The mandrel and running-in tool apparatus will continue descending through the tubing string G, with the fluid in the tubing string being able to bypass through the tool, flowing upwardly through the passages 24, 28 in the mandrel and up through the retracting tubing 66, discharging through the side ports 70 in the running-in tool 60. Descent of the mandrel and running-in tool can continue until the head 63 engages the upper stop shoulder 18, at which time the latch dogs 42, 52 are disposed in alignment with the upper lock groove 21 in the outer body 12, the springs 45 promptly expanding the upwardly holding latch dogs 42 into the recess 21, which will engage the upper side of the recess 21 and prevent substantial upward movement of the mandrel 19 within the outer body member 12. The mandrel 19 will then be in the position illustrated in FIGS. 1a and 1b, which is the crossover position described above. An upward strain or jarring action can now be taken on the wire line (not shown), which will shear the screws 64 and release the running-in head 63 from the mandrel head 61, the running-in tool 60 being elevated to remove the retracting tube 66 from contact with the noses 54 of the downwardly holding latches, the latter then expanding outwardly into the upper recess 21 to prevent downward movement of the mandrel 19 within the outer body member 12. The running-in tool 60 with its retracting tube 66 can now be removed from the tubing string G by elevating the wire line.

As described above, the apparatus is now in the crossover position, with the production from the lower zone C flowing through the mandrel passage 24 and into the tubing-casing annulus H, production from the upper zone B flowing into the mandrel passages 28, 29 and up through the tubing string G to the top of the well bore.

In lieu of initially lowering the mandrel 19 down through the tubular string G and locating it in the upper position illustrated in FIGS. 1a and 1b, it can be lowered down through the tubular string and located in the lower position illustrated in FIGS. 2a and 2b. Another or second running-in tool 60a can be secured to the mandrel by the shear screws 64, the retracting tube 66 extending into the passage 50 to hold the downwardly facing or holding latches 52 in a retracted position. The second head 63a of this tool 60a has a smaller external diameter than the head 63 previously referred to, being of lesser diameter than the upper passage portion r through the outer body 12, and, therefore, capable of entering such upper passage portion. The apparatus is run down through the tubular string G on a wire line (not shown) and will pass into the outer body 12, but will not come to rest until a shoulder 100, defining the lower end of an enlarged mandrel portion 101, engages the lower stop shoulder 20, at which time the latches 42, 52 will be disposed in alignment with the lower locking groove 22 of the body, the parts then being located in the position illustrated in FIGS. 2a and 2b.

With the parts in the position illustrated in FIGS. 2a and 2b, an upward pull or jar is taken on the wire lines, the upwardly facing latches 42 engaging the upper wall of the lower lock groove 22 to prevent substantial upward movement of the mandrel 19. The shear screws 64 are disrupted and the retracting tube 66 pulled upwardly from engagement with the downwardly holding latches 52, the latter then expanding outwardly under the influence of their springs 45 into the lock groove 22. Such downwardly holding latches 52 can prevent downward movement of the mandrel with respect to the outer body 12, but such purpose is unnecessary with the specific design illustrated in the drawings, in view of the fact that the downwardly facing mandrel shoulder 100 is in engagement with the lower stop shoulder 20.

With the parts located in the position disclosed in FIGS. 2a and 2b and upon removal of the running-in tool 60a from the tubing string G, fluid from the lower zone C can flow upwardly into the mandrel passages 28, 29 to be conducted through the tubing string G to the top of the well bore. Fluid from the upper zone B will flow through the body inlet port 16 and through the annular passage 38 between the reduced diameter portion 39 of the mandrel and the outer body 12 into and through the outlet port 15 above the packer F, to be conducted through the tubing-casing annulus H to the top of the well bore.

If the mandrel is in the crossed-over position illustrated in FIGS. 1a and 1b, the running-in tool 60 having been removed, it can be shifted downwardly to the conventional position illustrated in FIGS. 2a and 2b without withdrawing the mandrel from the tubular string. This can be accomplished by use of a shifting tool 102 illustrated in FIGS. 4 and 5. This shifting tool is designed to retract the downwardly holding latches 52 and to push the mandrel 19 downwardly in the body member 12. It is unnecessary for such shifting tool to retract the upwardly holding latches 42 since they will shift inwardly from the upper groove 21.

As shown, the latch retracting shifting or pushing tool 102 includes a head 103 adapted to be suitably secured to a wire line device connected to a wire line (not shown). Threadedly secured to the head is a depending stem 104 having a lower flange 105 on which a probe or prong 106 is swively mounted, there being a head 107 threaded on the upper end of this probe or prong and disposed above the stem flange 105, so that the probe can swivel on the stem 104, the parts being capable of joint longitudinal movement. The probe 106 has a smaller diameter than the passage 50 through the mandrel 19 to be capable of entering the passage. Its lower tapered end 108 is engageable with the nose portions 54 of the downwardly holding latches 52, moving down along such portions to shift them outwardly and the lower ends or dogs 53 of the latches inwardly. The probe 106 shifts downwardly within the mandrel 19 to the extent limited by engagement of the head 103 with the upper end of the mandrel 19 (FIG. 5). Since the latches 52 have been retracted from the upper groove 21, a downward pushing force imposed on the pushing tool 102 will cause its head 103 to engage the mandrel and shift the latter downwardly within the body 12 until the downwardly facing shoulder 100 engages the lower shoulder 20, at which time the upwardly facing latches 42 can expand outwardly into the lower groove 22 and prevent upward movement of the mandrel 19 within the tubular body 12. An upward pull can now be taken on the wire line which will elevate the pushing tool 102 from the mandrel and remove the probe 106 from its passage 50, leaving the mandrel latched in the position illustrated in FIGS. 2a and 2b, which is the conventional flow pattern position for conducting production from the lower zone C through the tubular string G to the top of the well bore and from the upper zone B through the tubing-casing annulus H to the top of the well bore.

The mandrel 19 can be shifted from the lower position illustrated in FIGS. 2a and 2b to the upper position illustrated in FIGS. 1a and 1b, to convert the apparatus A from conducting production in the conventional fashion to a crossed-over fashion to the top of the well bore. A pulling tool 110, illustrated in FIGS. 6 to 10, inclusive, can be used for this purpose. This pulling tool includes a head 111 having an upper threaded stem 112 for suitable attachment to a wire line (not shown), the lower end of the head being secured to a latch sleeve 113. The lower end of the sleeve 113 includes circumferentially spaced spring-like legs 114 terminating in inwardly directed latch feet 115 which are adapted to move downwardly past the mandrel head 61, with the feet disposed thereunder. The upper surfaces 116 of the feet are inclined in a downward and inward direction, being adapted to be cammed outwardly from engagement with the mandrel head 61 when sufficient upward force is imposed upon the latch sleeve 113.

Disposed within the latch sleeve 113 is a mandel 117 having its upper portion piloted within a central bore or passage 118 in the head 111. The upper end of the mandrel is constituted as an axial projection 119 engageable with an inner arm 120 of a latch lever 121 pivotally mounted on a hinge pin 122 secured to the head, the inner arm 120 and an outer arm 123 of the latch lever extending within a transverse slot 124 formed in the head intersecting its axial bore 118. The outer arm 123 of the latch lever is adapted to swing outwardly beyond the periphery of the head 111 and is capable of entering the upper internal groove 21. The outer arm 123 is urged toward its outwardly expanded position by a helical compression spring 125 surrounding the mandrel with its lower end engaging a spring seat provided by an internal flange 127 on the latch sleeve 113, with its upper end engaging a spring seat 128 contacting a flange 129 on the mandrel 117. The spring 125 forces the mandrel 117 upwardly, its projection 119 urging the inner arm 120 of the latch 121 upwardly to an extent limited by its engagement with a shear pin 130 secured to the head and extending across its slot 124. The engagement of the inner arm with the shear pin limits the extent of upward movement of the mandrel 117 within the head 111 and the sleeve 113. However, the mandrel can shift downwardly against the force of the spring 125 under the influence of the latch lever 121, to permit the latter to pivot in a counterclockwise direction (as seen in FIG. 6) out of the upper groove 21 or out of any coupling spaces in the tubular string G during lowering of the pulling tool 110 therewithin.

A stem 131 is threadedly secured to the lower end of the mandrel 117, which is surrounded by the upper portion of an elongate pulling probe 132, there being a head 133 threaded on the upper end of the probe adapted to rest upon the lower flange 134 of the stem and to be engaged by the lower end of the mandrel 117. Because of the arrangement disclosed, the pulling probe 132 can swivel upon the stem 131 and with respect to the mandrel 117, but is movable axially therewith in both directions. The pulling probe has a pair of diametrically opposite longitudinal grooves 135 therein adapted to receive the retracting noses 54 of the downwardly holding latches 52, so as to avoid retracting such latches. However, the pulling probe will engage the retracting noses 49 of the upwardly holding latches 42 for the purpose of shifting such noses outwardly and the upper dogs 44 of the latches inwardly from the lower groove 22. The probe 132 also has a lower tapered end 136 for swivelling the probe and placing its grooves 135 in alignment with the upper latch noses 54.

When it is desired to shift the mandrel from the lower position disclosed in FIGS. 2a and 2b to the upper position disclosed in FIGS. 1a and 1b, the pulling tool 110 is lowered in the tubular string with the shear pin 130 intact. During such lowering motion, the latch lever 121 can pivot on its hinge pin 122 and will shift the mandrel 117 and the probe 132 downwardly to a small extent against the force of the spring 125, allowing the arm 123 to move past coupling spaces and the upper body groove 21. The probe 132 enters the mandrel passage 50 and its lower end 136 engages the tapered noses 54 of the upper latches 52, the sides of which converge inwardly toward each other, the pulling probe swivelling on the mandrel 117 to a position in which the longitudinal grooves 135 are aligned with the noses 54. The probe 132 will then slide downwardly within the mandrel 19 and along the upper latch noses 54, which will prevent further turning of the probe. The lower portion of the probe will then engage the retracting noses 49 of the upwardly holding latches 42 and shift them outwardly and their dogs 44 inwardly from the lower groove 22. When the lower latches 42 have been retracted, the feet 115 of the latch sleeve 113 will have moved downwardly over the mandrel head 61 and will occupy a position thereunder, as disclosed in FIG. 6.

Figure 8:
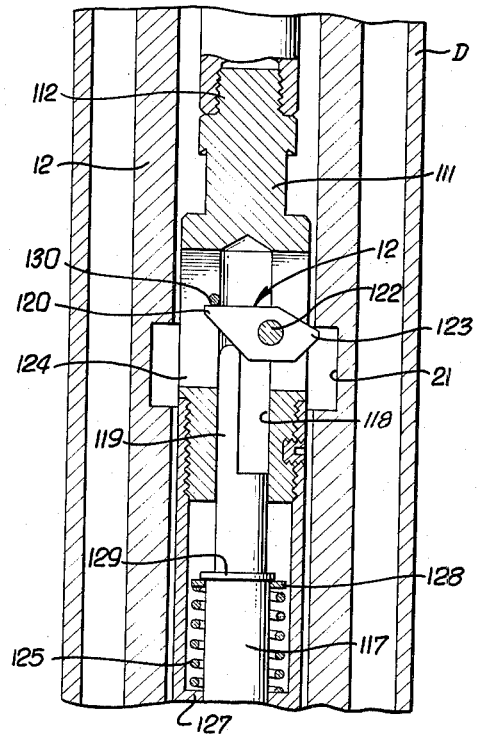
FIG. 8 is a view of the upper portion of the apparatus disclosed in FIG. 6 in another position within the tubing string.

With the upwardly holding latches 42 retracted, the wire line can be elevated to elevate the latch sleeve 113 and the mandrel 19, in view of the coupling engagement of the latch feet 115 under the mandrel head 61. The downwardly holding latches 52 will shift inwardly automatically out of the lower groove, the upwardly holding latches 42 having been retracted from such groove, as shown in FIG. 6, and being incapable of preventing upward movement of the mandrel. The mandrel 19 is moved upwardly to place the upwardly holding latches 42 above the lower groove 22. When this has occurred, the latch lever 121 will be pivoted outwardly by the mandrel 117 into the upper groove 21 under the influence of the spring 125, its outer arm 123 engaging the upper side of the upper groove 21, thereby preventing further upward movement of the pulling tool 110 and of the mandrel 19 (FIG. 8).

The taking of a sufficient upward pull on the wire line and head 111 will now tend to swing the outer arm 123 downwardly and the inner arm 120 upwardly against the shear pin 130. When the upward force is sufficient, the inner arm will shear the pin 130, thereby allowing the outer arm 123 to pivot on its hinge pin 122 downwardly of the head 111 and the upper arm 120 to shift in an upward direction, removing restraint from the mandrel 117. The spring 125 now shifts the mandrel 117, stem 131 and probe 132 upwardly of the mandrel 19 to remove it from engagement with the upwardly holding latches 42, as disclosed in FIG. 9. Continued elevation of the wire line will now move the pulling tool 110 upwardly with the upwardly holding latches 42 sliding along the wall of the outer body 12 until it reaches the upper groove 21, its springs 45 then forcing its dogs 44 into this groove, where engagement of the dogs with the upper side of the groove will prevent further upward movement of the latches 42. The downwardly facing latches 52 will also shift outwardly into the upper groove 21 and prevent downward movement of the mandrel 19 within the body 12, the mandrel 19 then being latched in the position illustrated in FIGS. 1a and 1b. The taking of a sufficient upward pull on the mandrel 111 will now cam the feet 115 outwardly from engagement with the mandrel head 61, releasing the pulling tool 110 from the flow control mandrel 19 and allowing the tool 110 to be withdrawn through the tubular string G to the top of the well bore.

The mandrel is now in the crossover flow position disclosed in FIGS. 1a and 1b, for the purpose of conducting fluid from the lower zone C through the annulus H to the top of the well, and from the upper zone B through the tubular string G to the top of the well bore.

If the mandrel 19 is to be removed from the well bore, a suitable pulling tool 80, such as disclosed in FIG. 11, is lowered on a wire line (not shown) through the tubing string G. Such pulling tool includes a retracting tube 81 adapted to enter the mandrel 19 and engage the nose portions 49, 54 of the upwardly holding and downwardly holding sets of latches 42, 52, shifting the dogs 44, 53 inwardly from a lock groove 21 or 22 and entirely within the confines of the mandrel. The pulling tool 80 has a plurality of spring-like arms 82 depending therefrom which will expand over the retrieving head 61 of the mandrel and dispose its inwardly directed fingers 83 below the head. An upper pull now taken on the pulling tool 80 will cause the fingers 83 to engage the underside of the head 61 and result in upward elevation of the mandrel 19 from the body member 12 and its complete removal therefrom, the retracting tube 81 holding the latches 42, 52 in their retracted positions so that they will not inadvertently catch in coupling spaces or other recesses in the tubing string G. The entire mandrel apparatus 19 is removed from the tubing string at the top of the hole.

If desired, prior to lowering the pulling or retrieving tool 80 through the tubing G for the purpose of removing the mandrel 19 from the body 12, a suitable tool (not shown) can be lowered in the tubing on a wire line, which has a prong (not shown) on its lower portion adapted to move downwardly through the mandrel 19 and engage a pressure equalizing plug 85 threaded in the mandrel between the seals 33, 34, this plug having a central passage 86 and a closed inner end 87. The equalizing prong will engage and break the plug 85, establishing communication between the interior and the exterior of the mandrel 19 between the seals 33, 34, which will effect an equalizing of the pressure above and below the packer F and facilitate withdrawal of the mandrel 19 from the outer body 12. For that matter, the equalizing prong could constitute a lower extension of the retracting tube 81 and engage the plug 85 to break the same.

It is, accordingly, apparent that an apparatus has been provided which can be initially placed in the tubular string G to conduct production from upper and lower zones B, C in a conventional or crossed-over manner. Regardless of the initial position of the mandrel 19, it can readily be shifted from a conventional to a crossed-over position, or from crossed-over to a conventional position, without necessitating its removal from the tubular string, all in a comparatively simple manner.

I claim:

1. In apparatus for conducting fluids between upper and lower zones in a well bore and the top of the well bore: a lower packer set in the well bore between the zones; an upper packer set in the well bore above the upper zone; a tubular string in the well bore operatively connected to said packers and including tubular body means; mandrel means movably mounted in said body means and with respect to said tubular string; said mandrel means and body means providing separate passages for conducting fluids from the upper and lower zones to the interior of the tubular string above said upper packer and to the space in the well bore above said upper packer externally of the tubular string; coengageable means on said mandrel means and body means for locating said mandrel means in a first position in said body means wherein said passages conduct fluid separately from the lower zone to said interior of the tubular string and from the upper zone to said space; coengageable means on said mandrel means and body means for locating said mandrel means in a second position in said body means wherein said passages conduct fluid separately from the lower zone to said space and from the upper zone to said interior of the tubular string; and means for shifting said mandrel means with respect to said tubular string and its body means between said first and second positions with said mandrel means remaining in said body means.

2. In apparatus for conducting fluids between upper and lower zones in a well bore and the top of the well bore: a lower packer set in the well bore between the zones; an upper packer set in the well bore above the upper zone; a tubular string in the well bore operatively connected to said packers and including tubular body means; mandrel means movably mounted in said body means and with respect to said tubular string; said mandrel means and body means providing separate passages for conducting fluids from the upper and lower zones to the interior of the tubular string above said upper packer and to the space in the well bore above said upper packer externally of the tubular string; means for locating said mandrel means in a first position in said body means wherein said passages conduct fluid separately from the lower zone to said interior of the tubular string and from the upper zone to said space; means for locating said mandrel means in a second position in said body means wherein said passages conduct fluid separately from the lower zone to said space and from the upper zone to said interior of the tubular string; means for releasably securing said mandrel means to said body means in said first position and in said second position; and means for releasing said securing means and for shifting said mandrel means with respect to said tubular string and its body means between said first and second positions with said mandrel means remaining in said body means.

3. In apparatus for conducting fluids between upper and lower zones in a well bore and the top of the well bore: a lower packer set in the well bore between the zones; an upper packer set in the well bore above the upper zone; a tubular string in the well bore operatively connected to said packers and including tubular body means; mandrel means moveable down through said tubular string into said body means; said mandrel means and body means providing separate passages for conducting fluids from the upper and lower zones to the interior of the tubular string above said upper packer and to the space in the well bore above said upper packer externally of the tubular string; stop means in said body means engaged by means on said mandrel means for locating said mandrel means in a first position in said body means wherein said passages conduct fluid separately from the lower zone to said interior of the tubular string and from the upper zone to said space; stop means on said body means engaged by means on said mandrel means for locating said mandrel means in a second position in said body means wherein said passages conduct fluid separately from the lower zone to said space and from the upper zone to said interior of the tubular string; and means for shifting said mandrel means between said positions with said mandrel means remaining in said body means.

4. In apparatus for conducting fluids between upper and lower zones in a well bore and the top of the well bore: a lower packer set in the well bore between the zones; an upper packer set in the well bore above the upper zone; a tubular string in the well bore operatively connected to said packers and including tubular body means; mandrel means movable down through said tubular string into said body means; said mandrel means and body means providing separate passages for conducting fluids from the upper and lower zones to the interior of the tubular string above said upper packer and to the space in the well bore above said upper packer externally of the tubular string; stop means in said body means engaged by means on said mandrel means for locating said mandrel means in a first position in said body means wherein said passages conduct fluid separately from the lower zone to said interior of the tubular string and from the upper zone to said space; stop means on said body means engaged by means on said mandrel means for locating said mandrel means in a second position in said body means wherein said passages conduct fluid separately from the lower zone to said space and from the upper zone to said interior of the tubular string; means on said mandrel means adapted to be releasably coupled to said body means to secure said mandrel means in said first position and in said second position; and means for releasing said releasable coupling means and for shifting said mandrel means between said first and second positions with said mandrel means remaining in said body means.

5. In apparatus for conducting fluids between upper and lower zones in a well bore and the top of the well bore: a lower packer set in the well bore between the zones; an upper packer set in the well bore above the upper zone; a tubular string in the well bore operatively connected to said packers and including tubular body means; mandrel means movable down through said tubular string into said body means; said mandrel means and body means providing separate passages for conducting fluids from the upper and lower zones to the interior of the tubular string above said upper packer and to the space in the well bore above said upper packer externally of the tubular string; said body means having upper and lower stop shoulders therein; a first stop means adapted to be mounted on said mandrel means and engageable with one of said shoulders for locating said mandrel means in a first position in said body means wherein said passages conduct fluid separately from the lower zone to said interior of the tubular string and from the upper zone to said space; a second stop means on said mandrel means and engageable with another of said shoulders for locating said mandrel means in a second position in said body means wherein said passages conduct fluid separately from the lower zone to said space and from the upper zone to said interior of the tubular string; said body means having upper and lower lock grooves therein; coupling means on said mandrel means expandible into a selected lock groove to releasably secure said mandrel means in either of said positions, said coupling means being expandible into said upper groove when one of said stop means engages said upper shoulder, said coupling means being expandible into said lower groove when another of said stop means engages said lower shoulder; and means for releasing said coupling means from said grooves and for shifting said mandrel means between said positions.

6. In apparatus for conducting fluids between upper and lower zones in a well bore and the top of the well bore: a lower packer set in the well bore between the zones; an upper packer set in the well bore above the upper zone; a tubular string in the well bore operatively connected to said packers and including tubular body means; mandrel means movable down through said tubular string into said body means; said mandrel means and body means providing separate passages for conducting fluids from the upper and lower zones to the interior of the tubular string above said upper packer and to the space in the well bore above said upper packer externally of the tubular string; said body means having upper and lower grooves therein; coupling means on said mandrel means expandible into said grooves to releasably secure said mandrel means in a first position in said body means wherein said passages conduct fluid separately from the lower zone to said interior of the tubular string and from the upper zone to said space, or in a second position in said body means wherein said passages conduct fluid separately from the lower zone to said space and from the upper zone to said interior of the tubular string; and means for releasing said coupling means from said grooves and for shifting said mandrel means between said positions.

7. In apparatus for conducting fluids between upper and lower zones in a well bore and the top of the well bore: a lower packer set in the well bore between the zones; an upper packer set in the well bore above the upper zone; a tubular string in the well bore operatively connected to said packers and including tubular body means; mandrel means movably mounted in said body means and with respect to said tubular string; said mandrel means and body means providing separate passages for conducting fluids from the upper and lower zones to the interior of the tubular string above said upper packer and to the space in the well bore above said upper packer externally of the tubular string; coengageable means on said mandrel means and body means for locating said mandrel means in a first position in said body means wherein said passages conduct fluid separately from the lower zone to said interior of the tubular string and from the upper zone to said space; coengageable means on said mandrel means and body means for locating said mandrel means in a second position in said body means wherein said passages conduct fluid separately from the lower zone to said space and from the upper zone to said interior of the tubular string; one of said positions being lower than the other of said positions; and means for shifting said mandrel means with respect to said tubular string and its body means from said lower position upwardly to said other of said positions.

8. In apparatus for conducting fluids between upper and lower zones in a well bore and the top of the well bore: a lower packer set in the well bore between the zones; an upper packer set in the well bore above the upper zone; a tubular string in the well bore operatively connected to said packers and including tubular body means; mandrel means movably mounted in said body means and with respect to said tubular string; said mandrel means and body means providing separate passages for conducting fluids from the upper and lower zones to the interior of the tubular string above said upper packer and to the space in the well bore above said upper packer externally of the tubular string; means for locating said mandrel means in a first position in said body means wherein said passages conduct fluid separately from the lower zone to said interior of the tubular string and from the upper zone to said space; means for locating said mandrel means in a second position in said body means wherein said passages conduct fluid separately from the lower zone to said space and from the upper zone to said interior of the tubular string; means for releasably securing said mandrel means to said body means in said first position and in said second position; one of said positions being lower than the other of said positions; and means for releasing said securing means and for shifting said mandrel means with respect to said tubular string and its body means from said lower position upwardly to said other of said positions.

9. In apparatus for conducting fluids between upper and lower zones in a well bore and the top of the well bore: a lower packer set in the well bore between the zones; an upper packer set in the well bore above the upper zone; a tubular string in the well bore operatively connected to said packers and including tubular body means; mandrel means movably mounted in said body means and with respect to said tubular string; said mandrel means and body means providing separate passages for conducting fluids from the upper and lower zones to the interior of the tubular string above said upper packer and to the space in the well bore above said upper packer externally of the tubular string; coengageable means on said mandrel means and body means for locating said mandrel means in a first position in said body means wherein said passages conduct fluid separately from the lower zone to said interior of the tubular string and from the upper zone to said space; coengageable means on said mandrel means and body means for locating said mandrel means in a second position in said body means wherein said passages conduct fluid separately from the lower zone to said space and from the upper zone to said interior of the tubular string; one of said positions being lower than the other of said positions; and means for shifting said mandrel means with respect to said tubular string and its body means from said other of said positions downwardly to said lower positions with said mandrel means remaining in said body means.

10. In apparatus for conducting fluids between upper and lower zones in a well bore and the top of the well bore: a lower packer set in the well bore between the zones; an upper packer set in the well bore above the upper zone; a tubular string in the well bore operatively connected to said packers and including tubular body means; mandrel means movably mounted in said body means and with respect to said tubular string; said mandrel means and body means providing separate passages for conducting fluids from the upper and lower zones to the interior of the tubular string above said upper packer and to the space in the well bore above said upper packer externally of the tubular string; means for locating said mandrel means in a first position in said body means wherein said passages conduct fluid separately from the lower zone to said interior of the tubular string and from the upper zone to said space; means for locating said mandrel means in a second position in said body means wherein said passages conduct fluid separately from the lower zone to said space and from the upper zone to said interior of the tubular string; means for releasably securing said mandrel means to said body means in said first position and in said second position; one of said positions being lower than the other of said positions; and means for releasing said securing means and for shifting said mandrel means with respect to said tubular string and its body means from said other of said positions downwardly to said lower position with said mandrel means remaining in said body means.

11. In apparatus for conducting fluids between upper and lower zones in a well bore and the top of the well bore: a lower packer set in the well bore between the zones; an upper packer set in the well bore above the upper zone; a tubular string in the well bore operatively connected to said packers and including tubular body means; mandrel means movable down through said tubular string into said body means; said mandrel means and body means providing separate passages for conducting fluids from the upper and lower zones to the interior of the tubular string above said upper packer and to the space in the well bore above said upper packer externally of the tubular string; said body means having upper and lower grooves therein; coupling means on said mandrel means expandible into said grooves to releasably secure said mandrel means in a first position in said body means wherein said passages conduct fluid separately from the lower zone to said interior of the tubular string and from the upper zone to said space, or in a second position in said body means wherein said passages conduct fluid separately from the lower zone to said space and from the upper zone to said interior of the tubular string; and means for releasing said coupling means from said lower groove and for elevating said mandrel means in said body means from one of said positions to the other of said positions.

12. In apparatus for conducting fluids between upper and lower zones in a well bore and the top of the well bore: a lower packer set in the well bore between the zones; an upper packer set in the well bore above the upper zone; a tubular string in the well bore operatively connected to said packers and including tubular body means; mandrel means movable down through said tubular string into said body means; said mandrel means and body means providing separate passages for conducting fluids from the upper and lower zones to the interior of tubular string above said upper packer and to the space in the well bore above said upper packer externally of the tubular string; said body means having upper and lower grooves therein; coupling means on said mandrel means expandible into said grooves to releasably secure said mandrel means in a first position in said body means wherein said passages conduct fluid separately from the lower zone to said interior of the tubular string and from the upper zone to said space, or in a second position in said body means wherein said passages conduct fluid separately from the lower zone to said space and from the upper zone to said interior of the tubular string; and means for releasing said coupling means from said upper groove and for lowering said mandrel means in said body means from one of said positions to the other of said positions.

13. In apparatus for conducting fluids between upper and lower zones in a well bore and the top of the well bore: a lower packer set in the well bore between the zones; an upper packer set in the well bore above the upper zone; a tubular string in the well bore operatively connected to said packers and including tubular body means; mandrel means movable down through said tubular string into said body means; said mandrel means and body means providing separate passages for conducting fluids from the upper and lower zones to the interior of the tubular string above said upper packer and to the space in the well bore above said upper packer externally of the tubular string; said body means having upper and lower stop shoulders therein; a first stop means adapted to be mounted on said mandrel means and engageable with one of said shoulders for locating said mandrel means in a first position in said body means wherein said passages conduct fluid separately from the lower zone to said interior of the tubular string and from the upper zone to said space; a second stop means on said mandrel means and engageable with another of said shoulders for locating said mandrel means in a second position in said body means wherein said passages conduct fluid separately from the lower zone to said space and from the upper zone to said interior of the tubular string; said body means having upper and lower lock grooves therein; coupling means on said mandrel means expandible into a selected lock groove to releasably secure said mandrel means in either of said positions, said coupling means being expandible into said upper groove when one of said stop means engages said upper shoulder, said coupling means being expandible into said lower groove when another of said stop means engages said lower shoulder; and means for releasing said coupling means from said lower groove and for elevating said mandrel means in said body means from one of said positions to the other of said positions.

14. In apparatus for conducting fluids between upper and lower zones in a well bore and the top of the well bore: a lower packer set in the well bore between the zones; an upper packer set in the well above the upper zone; a tubular string in the well bore operatively connected to said packers and including tubular body means; mandrel means movable down through said tubular string into said body means; said mandrel means and body means providing separate passages for conducting fluids from the upper and lower zones to the interior of the tubular string above said upper packer and to the space in the well bore above said upper packer externally of the tubular string; said body means having upper and lower stop shoulders therein; a first stop means adapted to be mounted on said mandrel means and engageable with one of said shoulders for locating said mandrel means in a first position in said body means wherein said passages conduct fluid separately from the lower zone to said interior of the tubular string and from the upper zone to said space; a second stop means on said mandrel means and engageable with another of said shoulders for locating said mandrel means in a second position in said body means wherein said passages conduct fluid separately from the lower zone to said space and from the upper zone to said interior of the tubular string; said body means having upper and lower lock grooves therein; coupling means on said mandrel means expandible into a selected lock groove to releasably secure said mandrel means in either of said positions, said coupling means being expandible into said upper groove when one of said stop means engages said upper shoulder, said coupling means being expandible into said lower groove when another of said stop means engages said lower shoulder; and means for releasing said coupling means from said upper groove and for lowering said mandrel means in said body means from one of said positions to the other of said positions.

15. In apparatus for conducting fluids between upper and lower zones in a well bore and the top of the well bore: a lower packer set in the well bore between the zones; an upper packer set in the well bore above the upper zone; a tubular string in the well bore operatively connected to said packers and including tubular body means; mandrel means movably mounted in said body means; said mandrel means and body means providing separate passages for conducting fluids from the upper and lower zones to the interior of the tubular string above said upper packer and to the space in the well bore above said upper packer externally of the tubular string; means for locating said mandrel means in a first position in said body means wherein said passages conduct fluid separately from the lower zone to said interior of the tubular string and from the upper zone to said space; means for locating said mandrel means in a second position in said body means wherein said passages conduct fluid separately from the lower zone to said space and from the upper zone to said interior of the tubular string; one of said positions being lower than the other of said positions; and means movable downwardly through the tubular string into engagement with said mandrel means to shift said mandrel means from said lower position upwardly to said other of said positions.

16. In apparatus for conducting fluids between upper and lower zones in a well bore and the top of the well bore: a lower packer set in the well bore between the zones; an upper packer set in the well bore above the upper zone; a tubular string in the well bore operatively connected to said packers and including tubular body means; mandrel means movably mounted in said body means; said mandrel means and body means providing separate passages for conducting fluids from the upper and lower zones to the interior of the tubular string above said upper packer and to the space in the well bore above said upper packer externally of the tubular string; means for locating said mandrel means in a first position in said body means wherein said passages conduct fluid separately from the lower zone to said interior of the tubular string and from the upper zone to said space; means for locating said mandrel means in a second position in said body means wherein said passages conduct fluid separately from the lower zone to said space and from the upper zone to said interior of the tubular string; one of said positions being lower than the other of said positions; and means movable downwardly through the tubular string into engagement with said mandrel means to shift said mandrel means from said other of said positions downwardly to said lower position.

17. In apparatus for conducting fluids between upper and lower zones in a well bore and the top of the well bore: a lower packer set in the well bore between the zones; an upper packer set in the well bore above the upper zone; a tubular string in the well bore operatively connected to said packers and including tubular body means; mandrel means movable down through said tubular string into said body means; said mandrel means and body means providing separate passages for conducting fluids from the upper and lower zones to the interior of the tubular string above said upper packer and to the space in the well bore above said upper packer externally of the tubular string; said body means having upper and lower grooves therein; coupling means on said mandrel means expandible into said grooves to releasably secure said mandrel means in a first position in said body means wherein said passages conduct fluid separately from the lower zone to said interior of the tubular string and from the upper zone to said space, or in a second position in said body means wherein said passages conduct fluid separately from the lower zone to said space and from the upper zone to said interior of the tubular string; and means movable downwardly through the tubular string into engagement with the mandrel means to release said coupling means from said lower groove and elevate said mandrel means from one of said positions to the other of said positions.

18. In apparatus for conducting fluids between upper and lower zones in a well bore and the top of the well bore: a lower packer set in the well bore between the zones; an upper packer set in the well bore above the upper zone; a tubular string in the well bore operatively connected to said packers and including tubular body means; mandrel means movable down through said tubular string into said body means; said mandrel means and body means providing separate passages for conducting fluids from the upper and lower zones to the interior of the tubular string above said upper packer and to the space in the well bore above said upper packer externally of the tubular string; said body means having upper and lower grooves therein; coupling means on said mandrel means expandible into said grooves to releasably secure said mandrel means in a first position in said body means wherein said passages conduct fluid separately from the lower zone to said interior of the tubular string and from the upper zone to said space, or in a second position in said body means wherein said passages conduct fluid separately from the lower zone to said space and from the upper zone to said interior of the tubular string; and means movable downwardly through the tubular string into engagement with said mandrel means to release said coupling means from said upper groove and lower said mandrel means from one of said positions to the other of said positions.

References Cited by the Examiner
UNITED STATES PATENTS

| | | | |
|---|---|---|---|
| 2,368,428 | 1/45 | Saurenman | 166—45 |
| 2,649,916 | 8/53 | Brown | 166—150 X |
| 2,717,041 | 9/55 | Brown | 166—45 |
| 2,766,831 | 10/56 | Otis | 166—114 X |
| 2,840,167 | 6/58 | Brown | 166—152 |
| 2,936,832 | 5/60 | Brown et al. | 166—115 |
| 3,008,522 | 11/61 | Fredd et al. | 166—115 |

CHARLES E. O'CONNELL, *Primary Examiner.*